United States Patent
Bärecke et al.

(10) Patent No.: US 12,371,036 B2
(45) Date of Patent: Jul. 29, 2025

(54) METHOD FOR OPERATING A MOTOR VEHICLE USING AN ERROR BRAKE SAFETY SYSTEM

(71) Applicant: Volkswagen Aktiengesellschaft, Wolfsburg (DE)

(72) Inventors: Frank Bärecke, Wolfsburg (DE); Hauke Christian Schlimme, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 43 days.

(21) Appl. No.: 17/462,142

(22) Filed: Aug. 31, 2021

(65) Prior Publication Data

US 2022/0063645 A1 Mar. 3, 2022

(30) Foreign Application Priority Data

Sep. 1, 2020 (DE) ...................... 10 2020 211 022.0

(51) Int. Cl.
*B60W 50/04* (2006.01)
*B60W 10/04* (2006.01)
(Continued)

(52) U.S. Cl.
CPC .......... *B60W 50/038* (2013.01); *B60W 10/04* (2013.01); *B60W 10/18* (2013.01);
(Continued)

(58) Field of Classification Search
CPC ........... B60W 50/038; B60W 60/0025; B60W 2556/45; B60W 10/04; B60W 10/18; G01C 21/3438
See application file for complete search history.

(56) References Cited

U.S. PATENT DOCUMENTS 9,963,143 B2 5/2018 Lu et al.
10,110,340 B1 10/2018 Mandeville-Clarke et al.
(Continued)

FOREIGN PATENT DOCUMENTS

CN 109923017 A 6/2019 .......... B60W 50/029
CN 110168506 A 8/2019 ............ B60W 10/00
(Continued)

OTHER PUBLICATIONS

Machine Translation—DE102017213496A1—Ramsauer et al. (Year: 2017).*

(Continued)

*Primary Examiner* — Scott A Browne
*Assistant Examiner* — Rami Nabih Bedewi
(74) *Attorney, Agent, or Firm* — Slayden Grubert Beard PLLC

(57) ABSTRACT

The invention relates to a method for operating a motor vehicle that, due to an error in a main brake system of the motor vehicle, is switched by means of a control circuit from a normal mode to an error mode in which a performance of a drive unit of the motor vehicle is reduced, and at least one navigation function of the motor vehicle is activated. The invention provides that an additional function of the motor vehicle is activated in error mode by means of the control circuit. Moreover, the invention relates to a safety system that is designed to perform the above method, as well as to a motor vehicle equipped with such a safety system.

14 Claims, 2 Drawing Sheets

(51) Int. Cl.
*B60W 10/18* (2012.01)
*B60W 50/038* (2012.01)
*B60W 60/00* (2020.01)
*G01C 21/34* (2006.01)

(52) U.S. Cl.
CPC ..... *B60W 60/0025* (2020.02); *G01C 21/3438* (2013.01); *B60W 2556/45* (2020.02)

(56) References Cited

U.S. PATENT DOCUMENTS

| | | | | |
|---|---|---|---|---|
| 2012/0200058 | A1* | 8/2012 | Sekiya | B60T 13/741 303/2 |
| 2016/0071418 | A1 | 3/2016 | Oshida et al. | 701/23 |
| 2017/0240167 | A1 | 8/2017 | Lu et al. | |
| 2018/0029577 | A1* | 2/2018 | Beauvais | B60T 8/176 |
| 2018/0194353 | A1* | 7/2018 | Kilmurray | B60W 30/18136 |
| 2018/0229738 | A1* | 8/2018 | Nilsson | B60T 7/12 |
| 2018/0236876 | A1* | 8/2018 | Isono | B60T 13/746 |
| 2018/0375608 | A1* | 12/2018 | Mandeville-Clarke | H04K 3/92 |
| 2019/0197497 | A1* | 6/2019 | Abari | G05D 1/0088 |
| 2019/0263423 | A1* | 8/2019 | Wakabayashi | B60W 30/09 |
| 2019/0340090 | A1 | 11/2019 | Grabs et al. | |
| 2020/0023859 | A1 | 1/2020 | Schmitt et al. | |
| 2020/0142407 | A1 | 5/2020 | Kozloski et al. | |
| 2020/0148218 | A1 | 5/2020 | Huang et al. | |
| 2021/0171062 | A1* | 6/2021 | Hecker | B60W 60/0015 |
| 2021/0181760 | A1* | 6/2021 | Lee | G05D 1/0287 |
| 2022/0017092 | A1* | 1/2022 | Kim | B60T 8/175 |
| 2023/0011375 | A1* | 1/2023 | Hecht | B66B 5/18 |

FOREIGN PATENT DOCUMENTS

| | | | | |
|---|---|---|---|---|
| DE | 102007019537 | A1 | 10/2008 | ............. B60T 13/58 |
| DE | 102014213171 | A1 | 10/2015 | ............. B60R 16/02 |
| DE | 102017102954 | A1 | 8/2017 | ............. B60W 30/00 |
| DE | 102017213496 | A1 * | 8/2017 | ............. B60W 30/08 |
| DE | 102018100148 | A1 | 7/2018 | ............. B60W 50/02 |
| DE | 102017209655 | A1 | 12/2018 | ......... B60W 50/029 |
| DE | 102018207311 | A1 | 11/2019 | ......... B60W 50/029 |
| DE | 102019109097 | A1 | 10/2020 | ............. G01M 17/00 |
| EP | 3333030 | A1 | 6/2018 | ............. B60T 8/96 |
| WO | 2014/180551 | A1 | 11/2014 | ............. B60T 8/88 |

OTHER PUBLICATIONS

Machine Translation of DE102017213496A1—Ramsauer et al. (Year: 2017).*
German Search Report, Application No. 102020211022.0, 7 pages, Apr. 8, 2021.
Chinese Office Action, Application No. 202111020027.3, 14 pages, Dec. 13, 2023.

* cited by examiner

METHOD FOR OPERATING A MOTOR VEHICLE USING AN ERROR BRAKE SAFETY SYSTEM

CROSS-REFERENCE TO RELATED APPLICATIONS

This application claims priority to German Patent Application No. DE 10 2020 211 022.0, filed on Sep. 1, 2020 with the German Patent and Trademark Office. The contents of the aforesaid Patent Application are incorporated herein for all purposes.

TECHNICAL FIELD

The invention relates to a method for operating a motor vehicle. Moreover the invention relates to a safety system for a motor vehicle, as well as a motor vehicle that is equipped with such a safety system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Today in automotive engineering, there are extensive efforts to increasingly automate motor vehicles, for example passenger cars, in order to increasingly remove additional driving responsibilities from a driver of the motor vehicle, or respectively passenger car. In this regard, the particular degree of automation, or respectively degree of autonomy, is divided into five levels according to SAE J3016. for example in conjunction with levels 4 and 5 in which it is at least permissible for the driver of the motor vehicle, or respectively passenger car to completely hand over the execution of the driving responsibilities to the motor vehicle at least temporarily, it may be necessary to design especially safe motor vehicles that are automated according to level 4 and/or 5.

With a fully automated motor vehicle (level 4), it is permissible for the driver to at least temporarily hand over the execution of the driving tasks, for example over an entire duration of a specific application, completely to the motor vehicle; in this case, the driver is only a passenger in the motor vehicle. With autonomous motor vehicles (level 5), there is no longer a human driver at all. This means that only passengers (and perhaps freight) are conveyed with the motor vehicle that is autonomous according to level 5, wherein these passengers never control or supervise/monitor a driving task of the motor vehicle. Consequently, in the event of a critical error that leads to a failure of a main brake system of the motor vehicle, the driver cannot react, or at least not fast enough, to this critical error, for example to brake the motor vehicle by means of a secondary brake system (such as manually). Therefore the motor vehicle that offers an operating mode according to level 4, or respectively according to level 5, is equipped with a secondary brake control system that, in the event of an error, for example immediately after the occurrence of the error, offers, and if applicable activates, a service brake function for the motor vehicle in order to safely brake or be able to brake the motor vehicle when the main brake system fails.

Moreover, it may be necessary for fully automated (level 4), or respectively autonomous (level 5) motor vehicles to not just stop driving following such a critical error of the main brake system. In other words, it may be necessary for travel with the motor vehicle to be able to be continued, at least in a restricted manner, even when the main brake system is subject to an error, for example has failed. During this ongoing travel in which the service brake function is then offered by means of the secondary brake system, another critical error may perhaps occur that leads to a failure of the secondary brake system. After this additional critical error, measures are to be provided in the motor vehicle so that the motor vehicle may at least be safely braked to a standstill. To accomplish this, it is for example provided that the motor vehicle is equipped with a tertiary braking system that offers a braking function for the motor vehicle in the event that the main brake system fails and the secondary brake system fails in order to be able to safely brake the motor vehicle to a standstill. During a driving mode in which the main brake system has failed, or respectively is subject to the critical error, wherein the service braking function is then offered to the motor vehicle by the secondary brake system, critical driving conditions that would overtax performance of the secondary brake system cannot be ruled out in advance until for example a service station is reached by the motor vehicle to rectify the damage to the main brake system, or respectively the critical error.

Occupants in the corresponding motor vehicle may consequently be subjected to a restricted operating mode of the corresponding vehicle in which for example drive performance of a drive unit of the corresponding vehicle is limited, and/or the fact that certain routes or route sections are avoided in restricted operating mode and, especially for safety reasons, cannot, or may only slightly, influence the restricted operating mode of the motor vehicle. For example when driving is interrupted or is significantly lengthened by the restricted operating mode of the corresponding motor vehicle, this may cause personal problems, or respectively inconveniences to the occupants of the motor vehicle, for example because the occupants will be late for an appointment, cannot keep reservations, etc.

SUMMARY

A need exists to provide options for occupants of a motor vehicle operating in an error mode to continue a journey very efficiently and very safely.

The need is addressed by a method, by a safety system, and by a motor vehicle according to the independent claims.

Embodiments of the invention are described in the dependent claims, the following description, and the drawings.

DESCRIPTION

Figure 1:
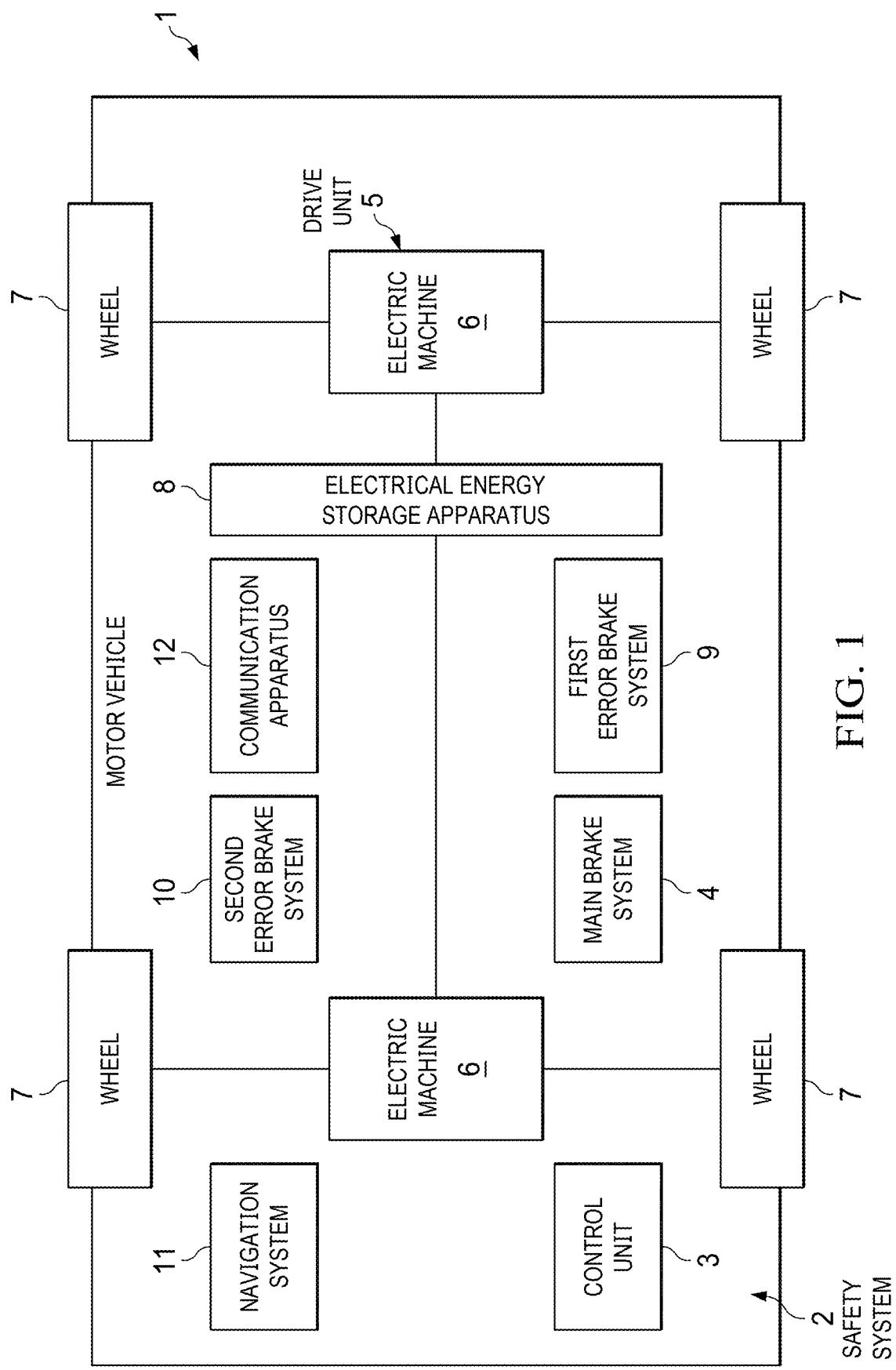
FIG. 1 schematically shows an embodiment of a motor vehicle that is equipped with a safety system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the exemplary embodiments described herein, the described components of the embodiments each represent individual features that are to be considered independent of one another, in the combination as shown or described, and in combinations other than shown or described. In addition, the described embodiments may also be supplemented by features of the invention other than those described.

According to a first exemplary aspect, a method is disclosed for operating a motor vehicle, wherein the motor vehicle is for example a car, for example a passenger car. Furthermore, the motor vehicle may be designed as a motor vehicle that may be driven, or respectively moved, at least fully automatically, for example autonomously. This means that the motor vehicle comprises means by which a fully automatic, for example autonomous driving mode for the motor vehicle or of the motor vehicle may be provided. In the method of the first exemplary aspect, the motor vehicle, or respectively the passenger car, is switched by a control circuit (also herein referred to as a control unit), that for example is a component of the motor vehicle, from normal mode to the least one error mode, for example a first error mode due to an error, for example a first error of a main brake system of the motor vehicle. If a critical error occurs in the main brake system, whereby the main brake system no longer functions, or no longer functions at full performance, and a service brake function provided by the main brake system is consequently restricted or has failed, this critical error is detected by the control circuit, for example in that the control circuit (e.g., continuously) monitors the main brake system, or respectively the service brake function provided by the main brake system. If it is determined by means of the control circuit that the main brake system is subjected to the critical error, i.e., the error, or respectively first error is present at/in the main brake system, the control circuit switches the motor vehicle to error mode, which is designed as the first error mode, as intended when the main brake system of the motor vehicle does not function, or does not completely function. In error mode, or respectively first error mode, a performance of a drive unit of the motor vehicle is then reduced, for example by means of the control circuit. If the main brake system of the motor vehicle is no longer functioning or is no longer functioning completely as desired, the control circuit for example prevents the motor vehicle from accelerating to a driving speed from which the motor vehicle would not be able to safely brake, for example by means of another brake system. The performance of the drive unit of the motor vehicle may for example be reduced to zero.

The method of the first exemplary aspect provides that at least one navigation function of the motor vehicle is activated. For example, such as by means of a navigation system of the motor vehicle and/or by means of the control circuit, a current driving route may be investigated in light of the error mode in order to exclude, or respectively circumvent at least one route section. Moreover it is conceivable for the navigation function activated in error mode to offer an alternative route, for example an alternative destination, wherein this alternative driving route, or respectively the alternative destination corresponds with the error mode of the motor vehicle, for example with a performance of the brake system, or respectively the brake systems of the motor vehicle that offers, or respectively offer the service brake function in error mode.

To prevent excessive schedule delays for the occupants of the motor vehicle operating in error mode, it is suggested to provide the occupants with options for continuing their travel efficiently and safely. Thus, in the method according to the present exemplary aspect, at least one additional function of the motor vehicle (i.e., an additional motor vehicle function) is activated in the error mode by means of the control circuit. This means that first the error mode of the motor vehicle is activated, second the performance of the drive unit is reduced, third the at least one navigation function of the motor vehicle is activated, and fourth the at least one additional function of the motor vehicle, or several functions of the motor vehicle, is/are activated in the motor vehicle.

This at least one additional motor vehicle function may for example be a function different from the navigation function of the motor vehicle. Alternatively or in addition and in some embodiments, the additional motor vehicle function may be configured as a subfunction of the navigation function of the motor vehicle. The at least one additional motor vehicle function is provided to set an expected travel time, or respectively an expected trip time for the occupants of the motor vehicle operated in error mode, wherein the occupants of the motor vehicle may reach their destination efficiently and safely, for example in a road-safe manner. This at least one additional motor vehicle function does not necessarily directly affect just the motor vehicle. Instead, the at least one additional motor vehicle function alternatively or in addition and in some embodiments takes into account and/or influences conditions in an environment of the motor vehicle. In other words, the at least one additional motor vehicle function affects the journey, or respectively trip of the particular occupant(s) of the motor vehicle and for example not just the motor vehicle with which the particular occupant embarks on the journey, or respectively trip.

In some embodiments, an error brake system in error mode is switched to an error operating mode so that the motor vehicle may be braked in error mode by means of the error brake system. If the main brake system has failed in the motor vehicle, i.e., the first error has occurred in the motor vehicle, or respectively the main brake system, the at least one additional function of the motor vehicle, or respectively the at least one additional motor vehicle function is activated, whereby the error brake system that may be a first brake error brake system in the event of a first error is switched to error operating mode. In this error operating mode, the first error brake system provides the service brake function at least partially for the motor vehicle. It may for example be the case that the main brake system of the motor vehicle is still partially functioning due to the first error so that the first error brake system helps the main brake system brake the motor vehicle in the first error operating mode. In other words, an overall service brake function for the motor vehicle is then provided by the first error brake system in cooperation with the main brake system.

If the motor vehicle is operated in first error mode, i.e., the service brake function for the motor vehicle is at least partially provided by the first error brake system, a critical error in the first error brake system may occur, which causes it to not function, or to no longer function fully. The motor vehicle is for example equipped with a second error brake system for this instance. If the critical error, or respectively an additional critical error (which is then termed a second error) occurs at/in the first error brake system, the motor vehicle is switched to a second error mode, wherein the at least one additional motor vehicle function then switches the second error brake system for its part to an error operating mode so that the motor vehicle may be braked by means of the second error brake system in the second error mode. It is moreover possible for the motor vehicle to be brakable in the second error mode, both by means of the first error brake system as well as by means of the second error brake system, i.e., by means of a combination of the first error brake system and the second error brake system. It may for example be the case that the first error brake system of the motor vehicle is still partially functioning due to the second error so that the second error brake system helps the first error brake system brake the motor vehicle in the second error operating mode. In other words, the overall service brake function for the motor vehicle is then provided by the second error brake system in cooperation with the first error brake system. If for example both the main brake system as well as the first error brake system are still partially functional as intended, it may moreover be provided that the overall service brake function for the motor vehicle is then provided by the second error brake system in cooperation with the main brake system and the first error brake system.

Consequently, the motor vehicle has at least two fallback systems downstream from the main brake system so that the motor vehicle, even when both the main brake system as well as the first error brake system have failed or are only partially functioning, may still be safely braked to a standstill. In this manner, motor vehicle road safety is especially taken into account.

For example in conjunction with the first error mode of the motor vehicle in which the service brake function is provided partially or completely by the first error brake system, continued driving with the motor vehicle is still ensured. This may for example be provided when, by means of the main brake system of the motor vehicle, a service brake function may still be provided for the most part and/or when, by means of the first error brake system, possibly in cooperation with the main brake system, the service brake function of the motor vehicle may be provided, at least for the most part.

Contrastingly, the second error brake system may be provided to brake the motor vehicle very safely to a standstill, wherein in second error mode, continued driving with the motor vehicle is not provided, or is only provided to a very limited extent and for example disabled, for example by reducing the performance of the drive unit to zero. In other words, the drive unit may be operated in second error mode such that it does not provide any drive power to move the motor vehicle. It is moreover provided that ongoing driving of the motor vehicle is continued in second error mode to leave a hazardous road section, or respectively to clear the motor vehicle therefrom. This means that ongoing driving is continued for example with reduced drive unit performance to avoid or overcome a critical traffic situation. If the motor vehicle is switched to the second error mode for example in an intersection, for a particularly high level of road safety, it is recommendable for the motor vehicle to drive out of the intersection under its own power. This is ensured by the— possibly restricted—continued driving.

Alternatively or in addition and in some embodiments, the method moreover provides that performance of the drive unit of the motor vehicle is established in error mode by performance of the error brake system of the motor vehicle. For the first error mode, this means that the performance of the drive unit is set, for example by means of the control circuit, with reference to the performance of the first error brake system. The same holds true for the second error mode: In this mode, the performance of the drive unit of the motor vehicle is established, for example reduced to zero, with reference to the performance of the second error brake system. It is furthermore conceivable to already adapt the performance of the drive unit (e.g., the maximum power output) to the (brake) performance of the second error brake system when the first error, and for example the second error, has not yet occurred. This provides that the second error brake system is not overtaxed by a driving condition of the motor vehicle when the second error brake system needs to provide the entire service brake function for the motor vehicle very quickly after the first error, or immediately, for example when the first and second errors occur simultaneously. Expressed otherwise, it is ensured that the driving condition that arises from throttling the performance of the first error brake system in first error mode is handled by the secondary brake system at the moment of a transfer/handover of deceleration tasks, i.e., the service brake function, of the motor vehicle to the second error brake system, i.e., when the second error occurs, especially directly.

This ensures in a particular manner that a performance of the drive unit of the motor vehicle does not exceed a performance of the particular error brake system so that road safety associated with the motor vehicle operated in error mode is especially high. The performance of the drive unit of the motor vehicle may for example be reduced by preventing acceleration to a driving speed from which it would be impossible for the corresponding error brake system to safely brake the motor vehicle. In this context, it may for example be provided that the drive unit of the motor vehicle is controlled, for example by means of the control circuit, such that the motor vehicle is still accelerated (less) by means of the drive unit for a specified or specifiable duration, and/or for a specified or specifiable distance, for example up to a driving speed from which the motor vehicle may still be safely braked by means of the corresponding error brake system. After this specified or specifiable duration has elapsed, and/or the specified or specifiable distance is reached, the performance of the drive unit is then throttled/reduced, for example set to zero.

Accordingly, it may be provided that continued driving in the first error mode of the motor vehicle is only maintained for the specified or specifiable duration and/or for the specified or specifiable distance. After the duration has elapsed and/or the distance is reached, the motor vehicle is then switched to second error mode in which the motor vehicle is then for example braked to a standstill by means of the second error brake system, and/or by means of the first error brake system, and/or by means of the main brake system in order to prevent further (potentially unsafe) participation in road traffic. A similar function is provided for the second error mode. When continued driving of the motor vehicle is enabled in second error mode (see above), continued driving to a restricted extent is for example maintained in order to leave the hazardous road section. In contrast to maintaining the first error mode, the specified or specifiable duration, and/or the specified and/or specifiable distance are/is less while maintaining continued driving in second error mode.

Moreover, the second error mode may be avoided by braking the motor vehicle to a standstill in first error mode by means of the first error brake system, and/or by means of the main brake system before the second error occurs. This may for example occur when the specifiable duration is/will be over and/or the specified or specifiable distance is/will be reached. Accordingly, the possibility of continued driving with the motor vehicle in first error mode is maintained until the specifiable duration is over, and/or the specifiable or specified distance is reached, after which the motor vehicle is then braked by means of the first error brake system and/or by means of the main brake system. There is therefore no wait until the second error occurs to brake the motor vehicle to a standstill. However, there is a wait to brake the motor vehicle to a standstill at least until the motor vehicle has left the hazardous road section.

In some embodiments, it is provided that, in error mode, for example first error mode, an error brake system of the motor vehicle downstream from the main brake system, for example the second error brake system, is switched to standby operating mode and is consequently preconditioned so that, in the event of an error of one of the other brake systems such as the first of the error brake systems, i.e., the first error brake system, the motor vehicle may be immediately braked at least by means of the error brake system downstream from the main brake system, i.e., for example the second error brake system, and with the corresponding error brake system at full performance. In other words, there is no wait to activate the error brake system, or respectively second error brake system configured as a fallback system until the critical error (second error) occurs in first error mode, i.e., at/in the first error brake system. Instead, the second error brake system that is to provide the service brake function for the motor vehicle due to the second error at/in the first error brake system is prepared to immediately provide the service brake function for the motor vehicle. Expressed otherwise, an especially seamless transition by the service brake function from the first error brake system to the second error brake system is ensured such that safe motor vehicle braking is ensured during a motor vehicle driving mode, even when the motor vehicle is being operated in first error mode. This again improves the road safety of a motor vehicle.

Moreover by preconditioning, the aim is pursued of improving the (particular) performance of the (particular) error brake system that is downstream from the main brake system and available directly after the at least partial assumption of the service brake function by the corresponding error brake system. If for example a brake actuator of the second error brake system is formed by an electric machine such as a drive motor of the motor vehicle, its regenerative braking power may be preconditioned and consequently optimized in that an electrical energy storage apparatus such as a traction battery of the motor vehicle is already discharged to a level in first error mode by connecting electrical consumers and/or by energy-inefficient driving. This therefore makes it possible for the traction battery, or respectively the energy storage apparatus to absorb more electrical energy that is generated by the regeneratively-operated electric machine while braking the motor vehicle to more efficiently reduce the driving speed of the motor vehicle.

In some embodiments, navigation based on the (particular) error mode is provided by the navigation function, such as a situationally appropriate route selection, for example destination selection, in error mode, i.e., in first error mode and/or in second error mode. This means that current navigation is adapted to first error mode and/or second error mode, whereby navigation based on the (particular) error mode is provided. It is moreover conceivable to replace current navigation with new navigation in order to provide the navigation based on the (particular) error mode. The navigation may therefore be adapted to the particular error brake system, or respectively its performance, at least indirectly. On the one hand in first error mode, navigation may be adapted to the first error brake system and/or if applicable to the second error brake system. On the other hand, at least in second error mode, navigation may be adapted to the second error brake system.

If the motor vehicle is for example operated in first error mode, navigation is modified, or respectively newly provided, such that it corresponds to the performance of the first error brake system so that driving situations along the navigation based on the first error may be handled safely by means of the first error brake system. Alternatively or in addition and in some embodiments, navigation is modified, or respectively newly provided in first error mode such that it corresponds with the performance of the second error brake system. This ensures that, by using the navigation based on the second error mode, the motor vehicle does not travel on a road section in first error mode that requires or permits driving situations which cannot, or may only be insufficiently, handled by means of the second error brake system. This is for example beneficial when it is anticipated that the second error is expected or least cannot be excluded due to a status of the first error brake system, and/or due to route conditions resulting from the new/modified navigation. Of course it is also conceivable in second error mode to provide this navigation based on the second error mode, for example after/during an occurrence of the second error.

The navigation system of the motor vehicle and/or the control circuit may be used for this. Accordingly, current navigation by which the motor vehicle is driving or being driven is modified once the motor vehicle is subjected to the first error mode and/or the second error mode. This means that the provision of the navigation based on the particular error mode constitutes the at least one additional function of the motor vehicle, or respectively the additional motor vehicle function. In this case, the at least one additional motor vehicle function is a subfunction of the navigation function that is activated due to the error, or respectively first error, and/or second error.

By providing the navigation based on the error mode, it is possible for example to undertake the situationally appropriate route selection such that at least one route section of the current navigation, for example the entire navigation, is modified with respect to the error mode of the motor vehicle. It may be that conditions for the motor vehicle exist along the current, i.e., unchanged driving route, or respectively using the unchanged navigation, that require driving maneuvers, or because of which driving maneuvers are enabled, that would not be able to be handled in a road-safe manner using the particular error brake system. Even if the drive unit of the motor vehicle were controlled by the control circuit such that the drive unit only provided a fraction of its full performance to accelerate, or respectively move the motor vehicle, the current, or respectively unchanged navigation may involve for example a downhill gradient being driven by the motor vehicle, which would then increase the driving speed of the motor vehicle in motor vehicle error mode, for example due to the downhill force acting on the motor vehicle, for example up to a driving speed value from which the motor vehicle might not be able to safely brake using the corresponding error brake system. It is then provided that at least this route section with the gradient is bypassed so that there is no danger of the driving speed of the motor vehicle exceeding the performance of the first error brake system, or the second error brake system, or a combination of the first error brake system and second error brake system (and if applicable the main brake system).

In this context and as provided in some embodiments, the control circuit and/or the navigation system of the motor vehicle provides information characterizing a trip of the motor vehicle by means of at least one motor vehicle-external apparatus, and/or by means of at least one motor vehicle-internal apparatus, by which the navigation in the error mode based on the error mode is provided. The trip of the motor vehicle includes for example an environment of the motor vehicle—the currently traveled navigation, for example the current driving route that is being traveled by the navigation system. The particular motor vehicle-external apparatus may for example be a server apparatus, for example a cloud server apparatus that is coupled or may be coupled to the control circuit and/or to the navigation system for data communication. To provide information at least partially characterizing the trip of the motor vehicle, the at least one motor vehicle-internal apparatus, or several motor vehicle-internal apparatuses, may moreover be used, for example the navigation system in which navigation data are or will be saved, a motor vehicle sensor system, for example an environmental sensing sensor system, a communication unit of the motor vehicle that is configured for vehicle-to-vehicle data communication, the drive unit, the main brake system, the first error brake system, the second error brake system, etc.

By using the information provided to the control circuit, or respectively the navigation system, a plurality of possible trip destinations (such as a travel destination of the occupants, a service station, or respectively workshop, a place to stop, or respectively parking space, etc.) is determined by the control circuit that may be reached safely, for example road-safe, by means of the motor vehicle operated in first error mode. For example, when determining the potential trip destinations, it is taken into account whether reaching the corresponding trip destination in a road-safe manner is covered by the performance of the second error brake system, for example if it is anticipated that the second error will occur. In doing so, the individual possible trip destinations are prioritized taking into account the performance of the error brake system, or respectively first error brake system and/or second error brake system so that the destination that is the easiest, or respectively safest of the destinations to reach is selected as the new trip destination with the motor vehicle operating in error mode. Moreover, the trip destinations may be prioritized taking into account the performance of the drive unit, for example if the performance of the drive unit will be or is throttled due to the first error mode and/or second error mode. In so doing, for example road sections that would lie along the trip route to the corresponding new trip destination using the current navigation are avoided that for example provide a particularly low friction coefficient between a road surface and tires of the motor vehicle due to poor weather conditions. Likewise, sections with a strong gradient are avoided on which, as already described, a driving speed of the motor vehicle may undesirably increase and/or that cannot be climbed by the motor vehicle due to the particular (throttled) performance of the drive unit in the particular error mode.

In this context, it is moreover possible in some embodiments that at least one occupant of the motor vehicle itself, or its operator if the motor vehicle is driving without occupants, for example as a pure occupant-free freight transport vehicle, prioritize the individual trip destinations, wherein the road restrictions specified by the control circuit and/or the navigation system are compared with the trip destination priorities of the occupant, or respectively the operator of the motor vehicle. In doing so, a route to the trip destination prioritized by the vehicle occupants is only proposed for example by the navigation system if it may be handled by at least one of the error brake systems. If this is not the case, the navigation system switches to another trip destination, and/or another route is proposed. In the event that the motor vehicle is configured fully automated or autonomously drivable, or respectively movable, the destination prioritized by the vehicle occupant/operator may only be driven to if it is reachable by the safe route. If this is not the case, the motor vehicle autonomously drives to one of the other destinations. Hazardous driving situations may be avoided by such a situation-appropriate selection of navigation with the safe route, or respectively destination. Moreover, beneficial use of the motor vehicle is possible for the occupant(s)/operator(s) if he/they may influence the routing of the motor vehicle. For example it may be that the operator of the motor vehicle who for example is not sitting in the motor vehicle as an occupant prefers ending a trip with the motor vehicle instead of driving to an alternative destination.

In some embodiments, collaborative occupant rescue is provided. In other words, it is provided in the method that an occupant exchange meeting point is identified by the motor vehicle in error mode, and another motor vehicle is called to this occupant exchange meeting point. This means that the at least one additional function of the motor vehicle, or respectively the at least one additional motor vehicle function, when it is activated, causes the occupant exchange meeting point to be identified, for example by the control circuit, once the critical error at/in the main brake system leads, or respectively has led to the first error mode of the motor vehicle. Moreover, the additional motor vehicle function in this case includes calling an additional motor vehicle to the occupant exchange meeting point so that the occupants of the motor vehicle subjected to the first error mode may continue their journey, or respectively trip with the motor vehicle called to the occupant exchange meeting point since the occupants from the motor vehicle operated in the first error mode may switch to the additional motor vehicle.

On the one hand, it is possible in some embodiments for the motor vehicle in which the first error has occurred to immediately identify the occupant exchange meeting point and call the additional motor vehicle to this occupant exchange meeting point once the first error has occurred. On the other hand, it is conceivable for the motor vehicle operating in first error mode to identify the occupant exchange meeting point and call the additional motor vehicle to this occupant exchange meeting point only when the motor vehicle has already operated for a while in error mode, or respectively first error mode, for example for the specified, or respectively specifiable duration. In some embodiments, the occupant exchange meeting point is identified by the motor vehicle before the specifiable, or respectively specified duration has passed in order to reach the identified occupant exchange meeting point as intended.

The additional motor vehicle may for example be a taxi, a rental car, a vehicle of a transport service, etc. It is also possible in some embodiments for the occupant exchange meeting point to be designated such that the occupants of the motor vehicle may reach a station of a scheduled traffic network very easily and/or with little effort in order to continue their particular journey, or respectively trip using the public means of transportation. For example with respect to an ever increasing automation of private transport, it may be provided that the motor vehicle called to the occupant exchange meeting point is designed to be drivable, or respectively movable in a fully-automated, for example autonomous manner. In this case, the vehicle-to-vehicle data communication may then for example be used between the motor vehicle that is subject to error mode and the motor vehicle called to the occupant exchange meeting point.

In some embodiments, an appointment relating to the occupant(s) is made or postponed autonomously in error mode by the motor vehicle. This means that when the motor vehicle is operating in error mode, for example first error mode, at least one appointment is made or postponed, or this is at least proposed to the occupant(s) by the motor vehicle, for example by the control circuit, without any active involvement of the particular occupant as the at least one additional function of the motor vehicle, or respectively as the additional motor vehicle function. To accomplish this, a communication apparatus or interface of the motor vehicle such as a cell phone may for example be used to establish a call center communication link via which the particular occupant of the motor vehicle may schedule, or respectively postpone the corresponding appointment with a (human) service employee of the call center.

Alternatively or in addition and in some embodiments, it may be provided that the communication apparatus includes a human/vehicle communication unit that for example is designed as a computer which is connected or may be connected to the Internet so that the particular occupant of the motor vehicle is able to enter corresponding data and/or commands via this human/vehicle communication apparatus by means of which the appointment affecting the occupant is scheduled or postponed.

In some embodiments, the motor vehicle autonomously schedules/postpones an appointment affecting the motor vehicle such as a service appointment, or to at least propose to the occupant(s) of the motor vehicle the performance of this autonomous function. Since it may be necessary to enable the occupants of the motor vehicle, which has stopped due to the error mode, for example first error mode and/or second mode, to continue their trip, or respectively journey in a manner that is very efficient and for example requires little effort, or respectively is comfortable, there may be need for an especially unplanned—interruption, or respectively break. For example due to the advanced time of day, it may be necessary to search for, or respectively provide accommodation for the occupants of the motor vehicle, which is enabled by the autonomous scheduling or postponement by the motor vehicle as the at least one additional motor vehicle function. It is for example possible that the motor vehicle autonomously makes and/or reschedules a hotel reservation.

According to a second exemplary aspect, a safety system is provided that is designed to perform the method according to the above description of the first exemplary aspect or any of the embodiments described. This means that the safety system has means which are configured to perform method steps of the above presented method.

According to a third exemplary aspect, a motor vehicle, for example a passenger car, comprises the above-described safety system. In some embodiments, the motor vehicle is a motor vehicle that may be driven, or respectively moved, at least fully automatically, for example autonomously. This means that the motor vehicle comprises means by which a fully automatic, for example autonomous driving mode for the motor vehicle or of the motor vehicle may be provided.

The present teachings also include combinations of the features of the described embodiments.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Elements having the same functions are, in each case, provided with the same reference numerals in the FIGS.

In the following, a method for operating a motor vehicle 1, a safety system 2 for performing the method, as well as the motor vehicle 1 will be jointly described using further embodiments.

The safety system that is identified in its entirety by reference number 2 has a control circuit 3 that in the present example is designed as part of the motor vehicle 1. In other words, the motor vehicle 1 has the safety system 2 and therefore the control circuit 3.

The motor vehicle 1 is designed to be moved fully automatically, for example autonomously. This means that for example an automation unit (not shown) for the motor vehicle 1 provides a fully automatic operating mode and/or an autonomous operating mood, which means that, in the motor vehicle 1, there is no mechanical connection between a possibly existing brake pedal and a hydraulic brake circuit, for example a main brake system 4 of the motor vehicle 1. This is especially because a driver, or respectively occupant or passenger of the motor vehicle 1 may not undesirably, or respectively accidentally initiate braking of the motor vehicle 1. If the motor vehicle 1 is designed to be drivable in a fully automated manner, the driver of the motor vehicle 1 is permitted to completely hand over driving of the vehicle, whereby the driver then becomes a (passive) passenger of the motor vehicle 1. If the motor vehicle 1 is designed to be autonomously drivable, the motor vehicle 1 takes over all of the driving tasks so that occupants of the autonomously drivable motor vehicle 1 are only considered passengers and no longer drivers. This means that in the motor vehicle 1, at least the main brake system is designed as a so-called brake-by-wire brake system (brake by wire: braking by wire, or respectively signal cable). The motor vehicle 1 designed to be drivable in a fully automated manner therefore has a so-called integrated brake control system that may be abbreviated as iBCS. This integrated brake control system is part of the main brake system 4 of the motor vehicle 1 that may be driven in a fully automated, or respectively autonomous manner, and detects a driver's braking request in a manual driving mode of the motor vehicle 1 by sensor monitoring of the brake pedal (if available). This braking request that is then present as an electrical signal is converted with the assistance of a master cylinder into a hydraulic brake pressure. This hydraulic brake pressure is then metered directly or indirectly to wheel brakes. Since the integrated brake control system possesses its own valve control, both ABS control interventions as well as ESP control interventions may be carried out by the integrated brake control system. The integrated brake control system therefore constitutes an apparatus for generating braking force and a control apparatus corresponding thereto.

In the present example, the motor vehicle 1 that for example may be operated, or respectively moved fully automatically and/or autonomously is designed as an at least partially electrically drivable, or respectively movable motor vehicle 1. This means that a drive unit 5 of the motor vehicle 1 is an electric drive unit. The electric drive unit 5 of the motor vehicle 1 has at least one electric machine 6, wherein it is not excluded that the motor vehicle 1 has at least one additional electric machine 6. It is for example conceivable for the motor vehicle 1 to have exactly one electric machine 6, exactly two electric machines 6, exactly three electric machines 6, exactly four electric machines 6, etc. For example, the particular electric machine 6 may be designed as a wheel hub motor, which means that a wheel hub of a particular wheel 7 of the motor vehicle 1 is at least partially formed by the particular electric machine 6. In the present example and as depicted in FIG. 1, the motor vehicle 1 has two electric machines 6, wherein the particular electric machine 6 interacts with a particular vehicle axle of the motor vehicle 1.

The electric drive unit 5 of the motor vehicle 1 moreover has an electrical energy storage apparatus 8 that may be coupled or is coupled to the electric machines 6. In order to drive, or respectively move the motor vehicle by means of the electric machines 6, the electric machines 6 are each motor-operated. In this case, the electric machines 6 are directly or indirectly connected to the electrical energy storage apparatus 8, for example to an electric traction battery, so that the electric machine 6 is provided, by means of the electrical energy storage apparatus 8, with electrical energy that is converted in each of the electric machines 6 into mechanical drive energy for the wheels 7.

The motor vehicle 1 is operable in a normal mode in which at least the aforementioned elements, i.e., at least the main brake system 4 and the drive unit 5 are operable or operated as intended with full performance. If the main brake system 4 suffers damage, the motor vehicle 1 is switched from normal mode to first error mode, for example by means of the control circuit 3. In this case, the main brake system 4 is damaged so that the motor vehicle 1 may only be braked to a reduced extent or not at all by the main brake system 4. Once it is subjected to the first error, the main brake system 4 only has reduced performance in comparison to the normal mode of the main brake system 4. In order to nonetheless be able to brake the motor vehicle 1 when the main brake system 4 no longer functions as desired, or respectively properly due to the critical error, or respectively first error, a first fallback level is provided in the motor vehicle 1 in the form of a first error brake system 9.

The first error brake system 9 has for example an additional integrated brake control system (iBCS) that may be designed the same as the aforementioned iBCS. For particularly high operational reliability of the motor vehicle 1, it is however possible in an embodiment if the first error brake system 9 has a brake control system different from the integrated brake control system, such as an ESC aggregate (ESC: electronic stability control). For example, the first error brake system 9 has brake actuators of the main brake system 4 as first error brake actuators. This means that the first error brake system 9 is designed to brake the motor vehicle 1 by means of the brake actuators of the main brake system 4.

Alternatively or in addition, the first error brake system 9 has the electric machines 6 so that the electric machines 6 then form a particular brake actuator in cooperation with the first error brake system 9, i.e., in first error mode of the motor vehicle 1. In order to brake the motor vehicle 1 that may be electrically driven, or respectively moved by means of the electric machines 6, the electric machines 6 are regeneratively driven. A braking force acting on the motor vehicle 1 is therefore generated by means of electric machines 6, or at least with one of the electrical machines 6, and counteracts a current driving speed vector of the motor vehicle 1. In this case, the kinetic energy of the motor vehicle 1 is converted into electrical energy that is for example provided to the electrical energy storage apparatus 8, for example fed thereto. If an energy absorption ability of the electrical energy storage apparatus 8 is fully utilized, or is insufficient to be able to brake the motor vehicle 1 as needed, another part of the electric energy may be provided to other electric consumers that are used in the motor vehicle 1. Moreover, it may be provided to generate reactive power in one of the electric machines 6 or in both electric machines 6, so that the electrical energy is converted into heat and is radiated by the respective electric machines 6. This heat may then be dissipated by means of an engine cooling system, if used in the motor vehicle 1. Alternatively or in addition, a brake resistor may be provided to which the electrical energy generated while braking is supplied, whereby conversion into heat also occurs.

Alternatively or in addition and in some embodiments, the first error brake system 9 may have an electronically controllable parking brake ("electronic parking brake") that is then controlled in first error mode of the motor vehicle 1, for example by means of the control circuit 3, in order to at least help brake the motor vehicle 1. In this respect, the first error brake actuators are then accordingly formed by the corresponding actuators of the parking brake.

As a second fallback level for the main brake system, or respectively as a first fallback level for the first error brake system, the motor vehicle 1 in the present example has a second error brake system 10 that is at least partially designed differently from the first error brake system 9. Analogous to the first error brake system 9, the second error brake system 10 may have or at least correspondingly control an additional integrated brake control system, an additional ESC aggregate, the electric machines 6, and/or the parking brake.

The second error brake system 10 is provided for the instance in which the motor vehicle 1 is already being operated in the first error mode, i.e., an operating function for the motor vehicle 1 is provided by the first error brake system 9. It cannot be ruled out that, in first error mode, an additional critical error will affect the first error brake system 9 so that it may no longer offer full performance. If this is the case, i.e., the motor vehicle 1, for example the main brake system 4 and the first error brake system 9, are subject to the second error, the control circuit 3 switches the motor vehicle 1 to a second error mode according to the method in which a service brake function is provided by the second error brake system 10.

It should be understood that full performance of the main brake system 4 is greater than full performance of the first error brake system 9. Moreover it should be understood that full performance of the first error brake system 9 is greater than full performance of the second error brake system 10. In other words, there is a hierarchy among the brake systems 4, 9, 10 for the motor vehicle 1. In normal mode, it is correspondingly possible in an embodiment to provide the operating function, for example completely, by the main brake system 4. However, it is not excluded to use the second error brake system 10, i.e., for example the electric machines 6, to help brake the motor vehicle even in normal mode. In the first error mode of the motor vehicle 1, i.e., when a critical error, or respectively first error is at/in the main brake system 4, the first error brake system 9 takes over the service brake function for the motor vehicle 1 or at least helps it in part.

To ensure that the performance of the particular error brake system is sufficient to brake the motor vehicle 1 in the corresponding error mode as intended, it is provided to reduce performance of the drive unit 5 of the motor vehicle 1, such as by means of the control circuit 3. For example, the performance of the drive unit 5 is reduced so that acceleration with the motor vehicle 1 to a driving speed is prevented from which it would not be safely possible to reliably brake the motor vehicle 1 by the first error brake system 9, and/or by the second error brake system 10, for example to a standstill. In doing so, it is provided for example to throttle the performance of the drive unit 5 corresponding to the performance of the first error brake system starting from the performance of the drive unit 5 in normal mode of the motor vehicle 1. Alternatively or in addition, the performance of the drive unit 5 may be throttled corresponding to the second error brake system 10 starting from normal mode.

In conjunction with the first error brake system 9, i.e., when the motor vehicle 1 is operating in first error mode (the main brake system 4 has suffered a critical error, i.e., the first error), it is provided that the performance of the drive unit 5 of the motor vehicle 1 is reduced, for example by the control circuit 3, namely corresponding to the performance of the first error brake system 9, and/or the second error brake system 10. In this context, the performance which may still be provided by the drive unit in first error mode may permit continued driving with the motor vehicle 1, for example until a hazardous road section has been left, and/or until a specified/specifiable duration and/or specified/specifiable driving distance is exceeded. At the latest upon/after leaving the hazardous road section, at the latest upon/after exceeding the specified/specifiable duration and/or at the latest upon/after exceeding the specified/specifiable driving distance, the performance is set to zero which then prevents continued driving, and the second error does not occur which protects the motor vehicle 1.

In conjunction with the second error brake system 10, i.e., when the motor vehicle 1 is operating in second error mode (the first error brake system 9 has suffered a critical error, i.e., the second error), it is also provided that the performance of the drive unit 5 of the motor vehicle 1 is reduced, for example by the control circuit 3. In this context, the performance which may then still be provided by the drive unit in second error mode may permit continued driving with the motor vehicle 1, for example until a hazardous road section has been left, and/or until a specified/specifiable duration and/or specified/specifiable driving distance is exceeded. At the latest upon/after leaving the hazardous road section, at the latest upon/after exceeding the specified/specifiable duration and/or at the latest upon/after exceeding the specified/specifiable driving distance, the performance is set to zero which then prevents continued driving. Correspondingly in the second error mode of the motor vehicle 1, the motor vehicle 1 may still at least be braked to a standstill by converting kinetic energy of the motor vehicle 1 by means of the second error brake system 10, for example into heat and/or electrical energy until the motor vehicle 1 has been braked to a standstill.

In FIG. 1, it may moreover be seen that the motor vehicle 1 has a navigation system 11 which is designed to propose a navigation, or respectively a route to a designated destination to a user of the motor vehicle 1. Since in the present example the motor vehicle 1 is designed to be drivable fully automatically, or respectively autonomously, it is provided that the motor vehicle 1 drives, or respectively is driven autonomously, or respectively fully automatically using the navigation that was determined, for example calculated, by the navigation system 11. The navigation therefore includes on the one hand the destination that is to be reached by the motor vehicle 1, and on the other hand at least one possible route to this destination.

To be able to establish communication, for example data communication, between the motor vehicle 1 and at least one additional motor vehicle, at least one infrastructure element, at least one server apparatus (cloud server apparatus), and/or to be able to establish a telephone connection, or respectively voice connection between occupants of the motor vehicle 1 and at least one additional person, the motor vehicle 1 has a communication apparatus 12 in the present example. This has for example a telephone element by means of which occupants of the motor vehicle 1 are able to have a phone conversation with a person located outside the motor vehicle 1. Moreover, it may be provided that the communication apparatus 12 has a data transceiver which corresponds with a particular data transceiver of the at least one additional motor vehicle, the infrastructure element, and/or the server apparatus, or respectively cloud server apparatus. Accordingly, vehicle-to-vehicle data communication, vehicle-to-infrastructure data communication, and/or data communication between the motor vehicle 1 and the server apparatus is enabled.

With respect to the safety system 2, this means that this (at least partially) includes the control circuit 3, the main brake system 4, the first error brake system 9, the second error brake system 10, the navigation system 11, and the communication apparatus 12. Moreover, it may be provided that the safety system 2 at least partially includes the drive unit 5. For example, the safety system 2 may include a particular control apparatus of the main brake system 4, the first error brake system 9, the second error brake system 10, the navigation system 11, the communication apparatus 12 and/or the drive unit 5, so that the main brake system 4, the first error brake system 9, the second error brake system 10, the navigation system 11, the communication apparatus 12 and/or the drive unit 5 of the motor vehicle 1 are/is controllable by means of the safety system 2, for example by means of its control circuit 3.

As already explained, the performance of the drive unit 5 of the motor vehicle 1 is reduced in error mode, i.e., first error mode, and/or in second error mode. Moreover in the particular error mode, at least one navigation function of the motor vehicle 1, for example the navigation system 11, is activated for example by means of the control circuit 3. In this context, it is for example, provided that the navigation of the navigation system 11 is changed insofar that, for example, the route is bypassed at least insofar that conditions along the route would preclude safe driving operation of the motor vehicle 1 when it is operated in first error mode or second error mode. For example, a particularly strong gradient is bypassed if driving downhill were required along the route, or respectively using the navigation since downhill driving with the vehicle 1 would lead to an increase in speed even if the performance of the drive unit 5 is throttled.

Moreover, the method provides that at least one additional function of the motor vehicle 1, i.e., a motor vehicle function, is activated in error mode (first error mode and/or second error mode) by the control circuit 3. For example, several additional motor vehicle functions are previously saved in the motor vehicle 1, for example in the control circuit 3, wherein at least one of these previously saved additional motor vehicle functions, or several of these previously saved motor vehicle functions, may be retrieved, or respectively activated.

For example, it is provided as a first additional motor vehicle function that, in the first error mode of the motor vehicle 1, the first error brake system 9 switches to an error operating mode so that the motor vehicle 1 may be braked in the error mode by the first error brake system 9 (as already described).

A second additional motor vehicle function may for example be designed to switch the second error brake system for its part to an error operating mode in the second error mode of the motor vehicle 1 so that the motor vehicle 1 may be braked in error mode, or respectively second error mode, by the second error brake system 10.

As already described above, the performance of the drive unit 5 may be adapted to the performance of one of the error brake systems 9, 10. This adaptation, or respectively throttling or reduction of the performance of the drive unit 5 may in this case be considered a third additional motor vehicle function that is activated once the motor vehicle 1 is being or is switched to the first error mode.

If a (for example fourth) additional motor vehicle function is activated, the second error brake system 10 is thereby switched in the first error mode of the motor vehicle 1 to a standby mode and consequently preconditioned. This means that in this case, the motor vehicle 1 is not yet operating in the second error mode, i.e., a critical error (second error) has not yet occurred at/in the first error brake system 9. The second error brake system 10 is already prepared in the first error mode of the motor vehicle 1 so that the second error brake system 10 may brake the motor vehicle 1 very quickly, for example immediately, once the critical error, or respectively second error, occurs at/in the first error brake system 9. The second error brake system is therefore preconditioned to assume the service brake function of the motor vehicle 1 as quickly as possible following the occurrence of the second error, for example to safely brake the motor vehicle 1 to a standstill.

Moreover by preconditioning, the aim is pursued of improving the (particular) performance of the (particular) error brake system 9, 10 downstream from the main brake system 4 that is available directly after the at least partial assumption of the service brake function by the corresponding error brake system 9, 10. If for example a brake actuator of the second error brake system 10 is formed by the electric machines 6, their regenerative braking power may be preconditioned and consequently optimized in that the electrical energy storage apparatus 8, or respectively the traction battery of the motor vehicle 1 is already discharged to a level in first error mode by connecting electrical consumers and/or by energy-inefficient driving. This therefore makes it possible for the traction battery to absorb more electrical energy that is generated by at least one of the regeneratively-operated electric machines 6 while braking the motor vehicle 1 to more efficiently reduce the speed of the motor vehicle 1.

The control circuit 3 in the present case is designed to monitor the brake systems 4, 9, 10 and consequently determine, or respectively ascertain a respective full performance of the corresponding brake system 4, 9, 10. The respective full performance of the corresponding brake system 4, 9, 10 is predominantly determined by influencing variables of the corresponding brake system 4, 9, 10 such as fading (loss of braking force due to the heating of a friction brake and/or a brake fluid), temperature fluctuations in the brake fluid, a variable state of charge (SoC) of the energy storage apparatus 8, temperature fluctuations of the energy storage apparatus 8, or respectively the traction battery, etc. If the control circuit 3 determines in this context that a failure or a significant loss of the performance of the corresponding brake system 4, 9, 10 is pending, the control circuit 3 activates the fourth additional motor vehicle function to prepare, or respectively precondition each downstream braking system 9, 10.

If the drive unit 5, for example the electric machines 6 are to be used for example as the first error brake system 9, wherein however the traction battery, or respectively the electrical energy storage apparatus 8 has a charge and/or a temperature that is too high to recuperate sufficiently, the drive unit 5 as the first error brake system 9 is then preconditioned if it is indicated for example due to fading that a critical error, or respectively the first error, will occur at/in the main brake system 4. It may accordingly for example be provided that the preconditioning of the first error brake system 9, or respectively the electric drive unit 5 includes properly discharging the electrical energy storage apparatus 8, for example by supplying additional electric consumers of the motor vehicle 1 with electrical energy from the electrical energy storage apparatus 8 to discharge the traction battery, or respectively the electrical energy storage apparatus 8 to a charge level corresponding to the first error mode. Moreover it may be provided that the motor vehicle 1 comes to a halt, or respectively stop to lower the temperature of the traction battery, or respectively the electrical energy storage apparatus at least enough for the temperature to then correspond with the initial error mode of the motor vehicle 1. If such a preconditioning is successful, the performance of the first error brake system 9, or respectively the drive unit 5 used as the first error brake system 9, is therefore particularly high so that for example particularly strong throttling of the performance of the drive unit 5 may be omitted. This means that for example a higher drive speed may be approved from which the motor vehicle 1 may then be braked as desired and safely by means of the drive unit 5. This analogously applies to the instance in which the second error brake system 10 includes the electric machines 6. The aforementioned measures to at least partially discharge the electrical energy storage apparatus 8 then occur in first error mode such that the charge level corresponds with the (anticipated) second error mode.

The particular additional motor vehicle function may also be a subfunction of a function already available in the motor vehicle 1, for example a navigation function. Accordingly for example, a (fifth) additional motor vehicle function provides navigation based on the first error mode and/or second error mode, such as a situationally-appropriate route selection, wherein for example a current destination and/or the current route are/is changed. Viewed differently, the fifth additional motor vehicle function may include changing a current navigation, wherein the navigation that is based on the error mode (or is new) is then provided by changing the current navigation. This means that, by means of the control circuit 3, the navigation system 11 is for example controlled to ascertain an alternative route to the current route and suggest this to the occupants of the motor vehicle 1. Furthermore it may be provided that the navigation system 11 and/or the control circuit 3 are designed to provide the alternative route such that the motor vehicle 1 follows the alternative route fully automatically, or respectively autonomously. In doing so, the restrictions associated with the particular error mode, or the restrictions caused by the particular error mode, are taken into account by the new navigation.

Based on navigation data, data from vehicle-to-vehicle data communication, data from vehicle-to-infrastructure data communication, data from vehicle to-server apparatus data communication, data that are provided by a sensor system, for example an environmental sensing sensor system of the motor vehicle 1, respective data from the respective error brake system, etc., a data set characterizing a trip of the motor vehicle 1 results that may be processed or further processed by means of the safety system 2, or respectively by means of the control circuit 3. Based on this data set that characterizes the trip of the motor vehicle 1, for example by using the current navigation, i.e., along the currently traveled driving route, the control circuit 3, or respectively the safety system 2 for the motor vehicle 1 which is operating in the first error mode or in the second error mode, determines the navigation based on the particular error mode. For example, the navigation based on the particular error mode includes a plurality of trip destinations (such as a travel destination of the occupants of the motor vehicle 1, a service station, or respectively workshop, a place to stop, or respectively a parking space, etc.). Moreover, the current navigation may be changed by the control circuit 3 and/or by the navigation system 11, for example an alternative destination and/or the alternative route are chosen such that the selected alternative destination may be reached with the motor vehicle 1 by the alternative route that is chosen because it is safe, wherein the performance of the drive unit 5 is taken into account in light of the chosen alternative route, and/or in light of the chosen alternative destination. This ensures that the performance of the drive unit is not overtaxed by an inappropriately chosen alternative route and/or by an inappropriately chosen alternative destination. In other words, the alternative route and/or alternative destination are to be chosen so that they may be safely driven to, or respectively reached by the motor vehicle.

Since the navigation based on the error mode is provided by using the performance of the particular error brake system 9, 10, this (new) navigation is adapted at least indirectly to the performance of the drive unit.

These trip destinations are prioritized by the control circuit 3 in the error mode of the motor vehicle 1 in terms of whether the currently available full performance of the particular error brake system 9, 10 is enough to be able to safely drive to the corresponding destination with the motor vehicle 1. Moreover, the prioritization may include whether the corresponding trip destination is (exclusively) reachable via the current trip route and/or via an alternative route. If the safety system 2, or respectively the control circuit 3 finds that the maximum available performance of the first error brake system 9 and/or the second error brake system 10 is insufficient for reaching the highest priority destination, a safer route to a lower priority trip destination is provided instead, for example by the navigation system 11. Weather data, gradient data, traffic data (such as about the traffic volume), etc. for example are used to prioritize the trip destinations in order to determine a particularly safe route to the corresponding trip destination. In addition, preferences of the occupants(s) or the operator(s) may be included in the prioritization of the trip destinations in order to generate for example the greatest benefit to the occupants/users of the motor vehicle.

By means of a (for example sixth) additional motor vehicle function, an occupant exchange meeting point is autonomously identified, for example by the safety system 2 and/or by the control circuit 3, and an additional motor vehicle is called to this occupant exchange meeting point. This is for example possible when continued driving with the motor vehicle 1 may only occur very slowly or not at all, for example when the motor vehicle 1 is switched to second error mode, whereby the motor vehicle 1 is braked to a complete standstill by the second error brake system 10. In the second error mode, the safety system 2, for example its control circuit 3, prevents continued driving with the motor vehicle 1 as intended since road safety could not otherwise be guaranteed. Under certain circumstances, this approach may be deviated from, for example if the motor vehicle 1 would come to a standstill at a hazardous and/or complex road section. Then it is possible to immediately leave the hazardous road section by means of the motor vehicle and under its own power. At least in this circumstance, or respectively to this end, it is provided that continued driving in second error mode is only ensured to bring the motor vehicle 1 and for example its occupants, if any, to safety.

To keep the occupants of the motor vehicle 1 that was braked to a complete standstill by the second error brake system 10 from "being stuck", the sixth additional motor vehicle function is enabled at the latest upon the occurrence of the second error, or respectively when the motor vehicle 1 is switched to second error mode, whereby the motor vehicle 1 autonomously, or respectively independently identifies the occupant exchange meeting point, and calls the additional motor vehicle to this occupant exchange meeting point. For example, the occupant exchange meeting point may be a location where the motor vehicle 1 was switched to second error mode. While continuing to drive, it is moreover conceivable to drive to the occupant exchange meeting point with the motor vehicle even in second error mode.

It is moreover conceivable for the motor vehicle 1 to identify the occupant exchange meeting point along the current trip route by triggering, or respectively activating the sixth additional motor vehicle function, wherein the motor vehicle 1 still drives up to the occupant exchange meeting point, for example in first error mode. This is beneficial since the additional motor vehicle may already be ordered to the occupant exchange meeting point while the motor vehicle 1 may still be driven. In this way, a very minor delay for the occupants of the motor vehicle 1 may be anticipated even though the motor vehicle 1 was switched to first error mode, which will delay a journey, or respectively trip of the occupants of the motor vehicle 1. The occupants therefore only have to wait a very short time until the additional motor vehicle arrives at the occupant exchange meeting point; ideally, the additional motor vehicle will arrive at the occupant exchange meeting point at the same time as the motor vehicle 1, or will already be waiting there.

It is moreover conceivable for the at least one additional motor vehicle function to extend to areas that are not directly associated with the motor vehicle 1. Accordingly for example by activating a (for example seventh) additional motor vehicle function through the motor vehicle 1, for example through the safety system 2, an appointment affecting the occupant(s) is autonomously scheduled or postponed. The safety system 2 recognizes that the motor vehicle 1 is switching to one of the error modes, whereby the risk exists that the corresponding occupant of the motor vehicle 1 will no longer reach or will be delayed in reaching his trip destination, or respectively travel destination. It is therefore conceivable for example for the motor vehicle 1, for example by means of the communication apparatus 12, to establish a voice communication link between the occupants of the motor vehicle 1 and a service employee, of a call center for example, wherein the (human) employee of the call center then makes corresponding booking changes, for example hotel bookings, etc. It is moreover conceivable for the communication apparatus 12, that has the computer apparatus connected to the Internet as already explained above, to be controlled, or respectively operated by the safety system 2, or respectively by the control circuit 3 so that the appointments, or respectively bookings affecting the occupant are rescheduled online without any active involvement of the occupant of the motor vehicle 1.

In conjunction with the seventh additional motor vehicle function, it is moreover conceivable for the motor vehicle 1 to autonomously schedule and/or postpone an appointment relating to the motor vehicle 1, for example a service appointment.

Figure 2:
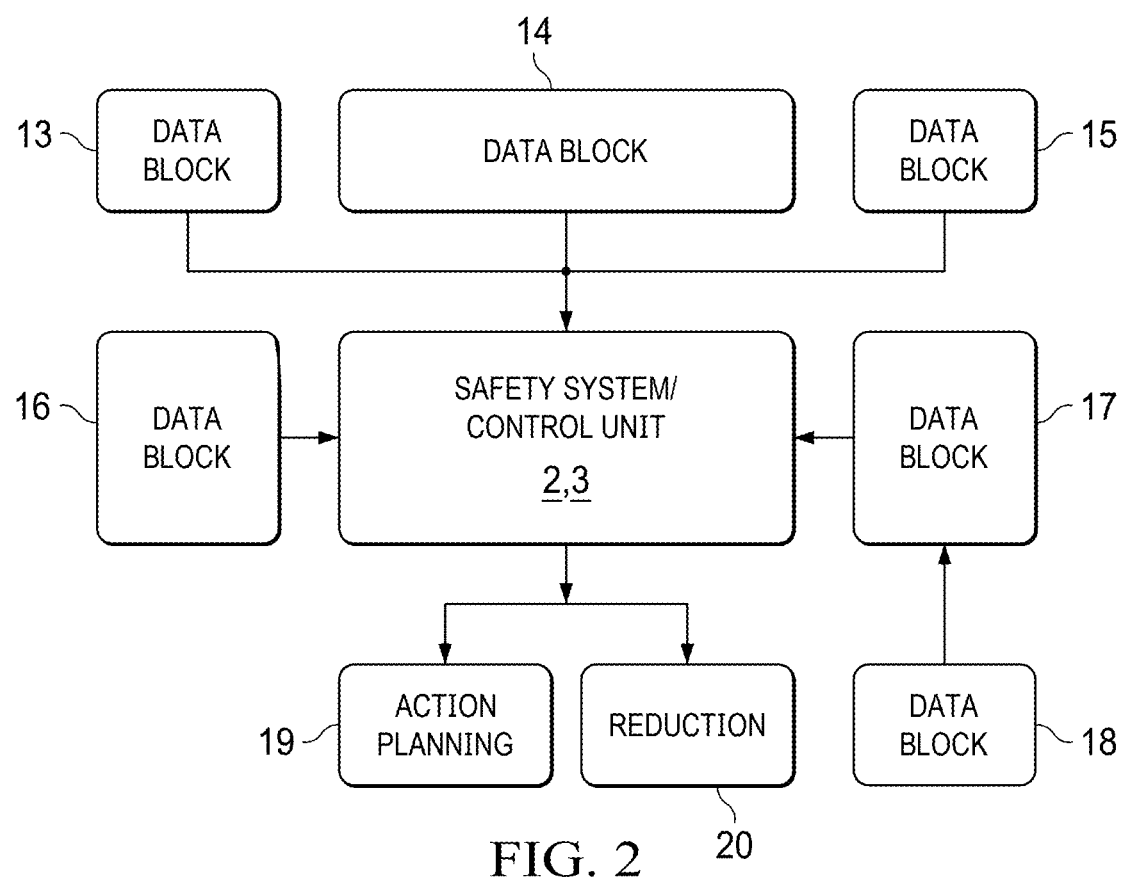
FIG. 2 shows an exemplary operating strategy for planning actions after a first error.

FIG. 2 shows an exemplary operating strategy for planning actions after the first error to illustrate method steps. The safety system 2, for example the control circuit 3, is shown in the center of FIG. 2, wherein the safety system 2, or respectively the control circuit 3 are provided data, or respectively conditions for planning actions that characterize an operating system of the motor vehicle 1. In a first block, or respectively data block 13, are the data, or respectively conditions characterizing the driving environment in the form of data, for example friction coefficients, inclinations/descents, curve radii, information on traffic volume, information on a number of lanes, etc., namely—for example in the form of a table—with reference to the respective trip destination, or respectively with reference to the individual trip routes that lead to the respective trip destinations. In this case, the respective trip destination may be one of the trip destinations that were suggested, or respectively set by means of the navigation system 11, or respectively by means of the control circuit 3 by the fifth additional motor vehicle function.

An additional data block 14 that is provided to the safety system 2, or respectively the control circuit 3 to plan actions has data characterizing the occupant(s) and/or the operator (s). For example, this data block 14 has information, or respectively data on the priority which the occupant, or respectively occupants prefer from the suggested destinations. The prioritization of the destination may for example be such that the occupant of the motor vehicle 1 has granted his actual travel destination top priority. It is moreover conceivable that the occupant of the motor vehicle 1 has granted a second highest priority to a workshop, or respectively a service station as the destination since he for example assumes that only a short stay at the service station is required to restore full performance of the entire motor vehicle 1. The occupant may have assigned a third highest priority to for example a place to stop, for example the occupant exchange meeting point, in order for example to switch to public transportation, or in order to switch to the additional motor vehicle that was called, for example autonomously, to the occupant exchange meeting point.

A third data block 15 characterizes a current status of the motor vehicle 1. Accordingly, the third data block 15 includes for example information on a fading status of friction brake elements of the motor vehicle 1, information on a state-of-charge of the traction battery, or respectively the electric energy storage apparatus 8, a temperature of the traction battery, etc.

To work out, or respectively implement the planning of the actions, the control circuit 3—for example in addition to the operating system to which the data blocks 13, 14, 15 belong—is provided with boundary conditions, wherein these boundary conditions are characterized by three data blocks 16, 17, 18. A minimum performance of the first error brake system 9 and/or the second error brake system 10 is saved in the data block 16, which is a first data block of the boundary conditions, said performance at least being needed to maintain a safe driving mode along the trip routes to a particular trip destination in the first error mode of the motor vehicle 1, and/or to avoid demanding too much performance from the second error brake system 10 when a second error occurs. Contrastingly, the second data block 17 of the boundary conditions contains a maximum available performance of the first error brake system 9 of which the first error brake system 9 is capable with respect to a vehicle status, or respectively a status of the first error brake system 9. Moreover, the second data block 17 contains a maximum available performance of the second error brake system of which the second error brake system 10 is capable with respect to a vehicle status, or respectively a status of the second error brake system 10. The third data block 18 of the boundary conditions describes this status of the first error brake system 9 as well as the second error brake system 10 through which influence may be exerted on the basis of the above-described preconditioning. Accordingly, the data block 18 describes the status of the first error brake system 9 as well as the second error brake system 10, for example with respect to a charge status of the electrical energy storage apparatus 8, with respect to a temperature of the electrical energy storage apparatus 8, with respect to a temperature of the brake elements, such as the electric machines 6.

From the data blocks 13, 14, 15, 16, 17, 18, the safety system 2, for example the control circuit 3, calculates or determines the action planning 19, wherein the action planning includes for example the activation of one of the above-described additional motor vehicle functions. Alternatively or in addition, the control circuit 3, or respectively the safety system 2 reduces, based on the data blocks 13, 14, 15, 16, 17, 18, the performance of the drive unit 5 that is provided with reference sign 20 in FIG. 2.

LIST OF REFERENCE NUMERALS

1 Motor vehicle
2 Safety system
3 Control unit
4 Main brake system
5 Drive unit
6 Electric machine
7 Wheel
8 Electrical energy storage apparatus
9 First error brake system
10 Second error brake system
11 Navigation system
12 Communication apparatus
13 Data block
14 Data block
15 Data block
16 Data block
17 Data block
18 Data block
19 Action planning
20 Reduction The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a motor vehicle, comprising: monitoring a main brake system for a critical error, the critical error corresponding to a loss of a service brake function of the main brake system;
   detecting the critical error;
   in response to detecting the critical error, switching the motor vehicle from a normal mode to an error mode in which a performance of a drive unit of the motor vehicle is reduced, comprising in the error mode: activating at least one navigation function of the motor vehicle; activating an additional function of the motor vehicle;
   switching an error brake system, separate from the main brake system, to an error operating mode so that the error brake system provides at least a part of the service brake function;
   and defining the performance of the drive unit of the motor vehicle according to a performance of the error brake system of the motor vehicle;
   wherein the main brake system comprises a first onboard system of the motor vehicle operable to reduce the rotating speed of one or more wheels of the motor vehicle;
   wherein the error brake system comprises a second onboard system of the motor vehicle operable to reduce the rotating speed of one or more wheels of the motor vehicle;
   and wherein an additional critical error in the error brake system triggers an emergency standstill operation using a second error brake system comprising a third onboard system of the motor vehicle separate from the main brake system and the error brake system, the second error brake system operable to reduce the rotating speed of one or more wheels of the motor vehicle;
   wherein the additional critical error corresponds to a loss of the service brake function in the error brake system;
   and wherein normal operation of the main brake system provides more braking power than the error brake system and operation of the error brake system provides more braking power than the second error brake system.

2. The method of claim 1, further comprising in the error mode: switching the error brake system of the motor vehicle to a standby operating mode and consequently preconditioning the error brake system so that, in the event of an error of another brake system, the motor vehicle may be immediately braked at least by the error brake system.

3. The method of claim 1, further comprising: providing navigation based on the error mode by the navigation function.

4. The method of claim 3, wherein when providing the navigation based on the error mode, information characterizing a trip of the motor vehicle is provided to the control circuit by a motor vehicle-external apparatus, and/or by a motor vehicle-internal apparatus, by which the navigation in the error mode based on the error mode is provided.

5. The method of claim 1, further comprising: identifying an occupant exchange meeting point autonomously by the motor vehicle in the error mode, and calling another motor vehicle to this occupant exchange meeting point.

6. The method of claim 1, further comprising: autonomously in the error mode by the motor vehicle making or postponing an appointment relating to at least one occupant of the motor vehicle.

7. The method of claim 2, further comprising: providing navigation based on the error mode by the navigation function.

8. The method of claim 2, further comprising: identifying an occupant exchange meeting point autonomously by the motor vehicle in the error mode, and calling another motor vehicle to this occupant exchange meeting point.

9. The method of claim 3, further comprising: identifying an occupant exchange meeting point autonomously by the motor vehicle in the error mode, and calling another motor vehicle to this occupant exchange meeting point.

10. The method of claim 4, further comprising: identifying an occupant exchange meeting point autonomously by the motor vehicle in the error mode, and calling another motor vehicle to this occupant exchange meeting point.

11. The method of claim 1, further comprising:
    comparing the error to a critical boundary condition in the error brake system;
    if the error exceeds the critical boundary condition, switching the motor vehicle to a second error mode, so that the motor vehicle may be braked using the second error brake system in the second error mode.

12. The method of claim 1, wherein the drive unit of the motor vehicle is controlled for a predefined duration and/or distance, such that the motor vehicle is limited to a predetermined maximum driving speed from which the motor vehicle may still be braked using the corresponding error brake system.

13. A safety system for a motor vehicle, the safety system comprising: a monitor testing a main brake system for a critical error corresponding to a loss of a service brake function of the main brake system;
    a controller programmed to, in response to detecting the critical error in the main brake system, switch the motor vehicle from a normal mode to an error mode in which a performance of a drive unit of the motor vehicle is reduced, wherein the controller in the error mode is further programmed to: activate at least one navigation function of the motor vehicle;
    activate an additional function of the motor vehicle;
    switch an error brake system, different from the main brake system, to an error operating mode so that the error brake system provides at least a part of the service brake function;
    and define the performance of the drive unit of the motor vehicle according to a performance of the error brake system of the motor vehicle;
    wherein the main brake system comprises a first onboard system of the motor vehicle operable to reduce the rotating speed of one or more wheels of the motor vehicle;

wherein the error brake system comprises a second onboard system of the motor vehicle operable to reduce the rotating speed of one or more wheels of the motor vehicle;

wherein an additional critical error in the error brake system triggers an emergency standstill operation using a second error brake system comprising a third onboard system of the motor vehicle separate from the main brake system and the error brake system, the second error brake system operable to reduce the rotating speed of one or more wheels of the motor vehicle;

wherein the additional critical error corresponds to a loss of the service brake function in the error brake system;

and wherein normal operation of the main brake system provides more braking power than the error brake system and operation of the error brake system provides more braking power than the second error brake system.

14. The motor vehicle with the safety system according to claim 13.

* * * * *